United States Patent
Hernandez Santisteban et al.

(10) Patent No.: US 10,437,336 B2
(45) Date of Patent: Oct. 8, 2019

(54) HAPTICS TO IDENTIFY BUTTON REGIONS

(71) Applicant: Microsoft Technology Licensing, LLC, Redmond, WA (US)

(72) Inventors: Adolfo Hernandez Santisteban, Bothell, WA (US); Donna K. Long, Redmond, WA (US); Andrew F. Muehlhausen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 15/639,550

(22) Filed: Jun. 30, 2017

(65) Prior Publication Data
US 2018/0329494 A1    Nov. 15, 2018

Related U.S. Application Data

(60) Provisional application No. 62/506,412, filed on May 15, 2017.

(51) Int. Cl.
| | | |
|---|---|---|
| *G06F 3/01* | (2006.01) | |
| *G06F 3/0488* | (2013.01) | |
| *G06F 1/16* | (2006.01) | |
| *G06F 3/044* | (2006.01) | |

(52) U.S. Cl.
CPC .............. *G06F 3/016* (2013.01); *G06F 1/1616* (2013.01); *G06F 3/0488* (2013.01); *G06F 3/044* (2013.01); *G06F 2203/04803* (2013.01)

(58) Field of Classification Search
CPC ........ G06F 3/016; G06F 3/041; G06F 3/0488; G06F 1/1616; G06F 2203/013; G06F 2203/014; G06F 2203/015
See application file for complete search history.

(56) References Cited

U.S. PATENT DOCUMENTS

| | | |
|---|---|---|
| 8,073,501 B2 | 12/2011 | Tierling et al. |
| 8,469,806 B2 | 6/2013 | Grant et al. |
| 8,502,651 B2 | 8/2013 | Birnbaum |
| 8,976,141 B2 | 3/2015 | Myers et al. |
| 9,024,908 B2 | 5/2015 | Sinclair |
| 2008/0024459 A1 | 1/2008 | Poupyrev et al. |
| 2009/0167704 A1 | 7/2009 | Terlizzi et al. |
| 2010/0020036 A1 | 1/2010 | Hui et al. |

(Continued)

FOREIGN PATENT DOCUMENTS

EP    2518588 A1    10/2012

OTHER PUBLICATIONS

Smith, Chris, "This is how Apple will use the iPhone 8 to improve on an iconic Samsung feature", http://bgr.com/2016/12/08/iphone-8-screen-design/, Published on: Dec. 8, 2016, 5 pages.

Purcher, Jack, "Apple invents an iPhone with Sidewall Displays, an Intelligent Scrolling Feature & Much More", http://www.patentlyapple.com/patently-apple/2014/08/apple-invents-an-iphone-with-sidewall-displays-an-intelligent-scrolling-feature-much-more.html, Published on: Aug. 28, 2014, 6 pages.

(Continued)

*Primary Examiner* — Sardis F Azongha
(74) *Attorney, Agent, or Firm* — Holzer Patel Drennan

(57) ABSTRACT

An electronic device includes memory associating a control action with a defined region on an external surface of the electronic device. A localized haptic feedback response is provided responsive to detection of initial touch input within the defined region, and the control action is executed responsive to detection of a touch direction performed in association with the defined region following the detection of the touch input.

16 Claims, 6 Drawing Sheets

(56) References Cited

U.S. PATENT DOCUMENTS

| | | | |
|---|---|---|---|
| 2010/0141606 A1 | 6/2010 | Bae et al. | |
| 2012/0283894 A1* | 11/2012 | Naboulsi | B60R 11/0264 701/1 |
| 2012/0327006 A1 | 12/2012 | Israr et al. | |
| 2013/0033366 A1 | 2/2013 | Mcdonough et al. | |
| 2013/0050090 A1* | 2/2013 | Stewart | G06F 3/04886 345/168 |
| 2013/0088439 A1 | 4/2013 | Shih et al. | |
| 2014/0098038 A1 | 4/2014 | Peek et al. | |
| 2014/0292668 A1* | 10/2014 | Fricklas | G06F 3/041 345/173 |
| 2016/0103496 A1* | 4/2016 | Degner | G06F 3/044 345/157 |
| 2016/0320843 A1 | 11/2016 | Long et al. | |
| 2017/0083092 A1* | 3/2017 | Levesque | G06F 3/016 |
| 2018/0210598 A1* | 7/2018 | Lu | G06F 3/0488 |

OTHER PUBLICATIONS

Kim, et al., "Haptic feedback design for a virtual button along force-displacement curves", In Proceedings of the 26th annual ACM symposium on User interface software and technology, Oct. 8, 2013, pp. 91-96.

Ulanoff, Lance, "Samsung's Galaxy S8 and S8+ prove you can never have too much screen", http://mashable.com/2017/04/18/samsung-galaxy-S8-plus-review/, Published on: Apr. 18, 2017, 11 pages.

"The power of touch: Making sense of haptic feedback", https://www.digitalpulse.pwc.com.au/haptic-feedback/, Published on: Nov. 14, 2016, 8 pages.

"International Search Report and Written Opinion Issued in PCT Application No. PCT/US2018/028729", dated Jun. 22, 2018, 10 Pages.

\* cited by examiner

HAPTICS TO IDENTIFY BUTTON REGIONS

CROSS-REFERENCE TO RELATED APPLICATIONS

The present application claims benefit of priority to U.S. Provisional Patent Application No. 62/506,412, entitled "HAPTICS TO DETERMINE BUTTON REGIONS" and filed on May 15, 2017, which is specifically incorporated by reference for all that it discloses and teaches.

BACKGROUND

Electronics with sleek and smooth exterior designs are increasing in popularity. Consequently, device manufactures are beginning to seek creative solutions that eliminate traditional three-dimensional buttons in favor of flat-screen, flat-panel, and flat-edge devices. While display panel touch-screens have largely eliminated traditional number and letter keys, many modern devices still include at least a few physical buttons associated with important device actions, such as actions that a user may sometimes prefer to initiate without looking at the device. For example, a three-dimensional button may give a user the ability to quickly reach into a jacket pocket to silence a ringing phone by finding edges of the button with his or her finger. Additionally, three dimensional buttons are easy to find in dark environments. For example, a user in a dark room may "feel" to find a power or display illumination button in the dark

SUMMARY

Implementations described and claimed herein provide an electronic device including memory associating a control action with a defined region on an external surface of the electronic device. Responsive to detection of touch input at the defined region, the electronic device provides a localized haptic feedback response at the defined region. Responsive to detection of a touch direction within the defined region, the electronic device executes the control action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology utilizes haptic feedback electronics to provide touch-detectable sensations that may assist a user in identifying a user interface region on a surface. This technology can be integrated within electronic devices to replace traditional push buttons without compromising functionality.

Figure 1:
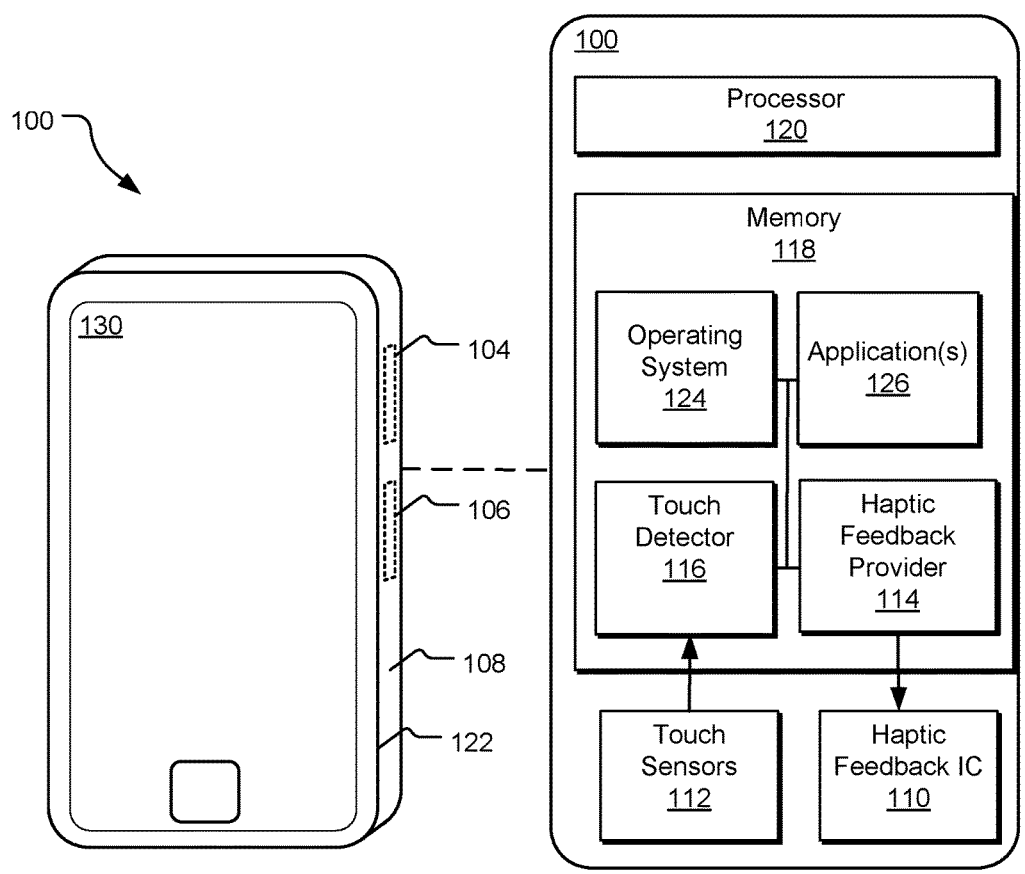
FIG. 1 illustrates an example electronic device including embedded haptic feedback electronics that allow a user to identify boundaries of one or more user interface regions on a flat external surface.

FIG. 1 illustrates an example electronic device 100 including embedded haptic feedback integrated circuitry (IC) 110 that allow a user to identify boundaries of one or more user interface (UI) button regions 104 and 106 (also referred to as "UI button regions") on an external surface 108. Like a traditional three-dimensional button, each of the UI button regions 104 and 106 facilitates initiation of some device control action (e.g., volume up, volume down, awaken from stand-by mode, initiate camera application); however, the UI button regions 104 and 106 do not move in and out relative to the external surface 108. Rather, each of the UI button regions 104 and 106 is flush and continuous with the external surface 108 such that the external surface 108 and the UI button regions 104 and 106 may be formed from a single continuous (e.g., planar) piece of material, such as plastic or glass.

In general, the haptic feedback IC 110 of the electronics device 100 is controlled by a processor 120 to provide a touch-detectable sensation(s) in localized areas defined by the UI button regions 104 and 106 (e.g., user interface (UI) regions of the external surface 108). The touch-detectable sensation(s) may include, for example, localized vibration, pulses of localized pressure, or variations in surface friction (e.g., modulated surface friction). The electronic device 100 includes touch sensors 112 physically located in proximity to each of the UI button regions 104 and 106. For example, the touch sensors 112 may include one or more capacitive sensors (e.g., a capacitance-sensing grid), or other proximity sensors such as optical sensors. In other implementations, the touch sensors 112 include piezoelectric actuators that detect a "touch pressure" of a user's finger by monitoring output voltage of the piezoelectric actuators generated due to strain caused by the pressure transferred to the piezoelectric actuators.

Feedback from the touch sensors 112 is provided to a touch detector 116 which, in turn, communicates with a haptic feedback provider 114 to trigger a haptic feedback response of the haptic feedback IC 110. For example, the haptic feedback response is provided responsive to detection of a user's touch within or near one of the UI button regions 104 and 106.

In one implementation, the haptic feedback IC 110 provides localized haptic feedback in regions that may be felt within or close to the UI button regions 104 and 106 but not felt in other areas along the external surface 108. For example, a user may slide a finger along the external surface 108 and feel a vibration or other sensation when the finger crosses a boundary of one of the UI button regions 104 and 106. In this sense, the user may be able to locate the UI button regions 104 and 106 without looking at the electronic device 100.

In some implementations, the UI button regions 104 and 106 overlap a light-emitting display, such as a display 130. For example, the haptic feedback electronics may be positioned behind the display 130 to allow a user to feel a vibration or other sensation when placing a finger on or over a digital icon on the display. In other implementations, the UI button regions 104 and 106 are included on a non-display surface of the electronic device, such as an edge region (as shown) or on a back side of the electronic device 100.

In various implementations, the haptic feedback IC 110 may be located on or below the external surface 108 in close proximity to corresponding UI button regions, such as the UI button regions 104 and 106. In FIG. 1, the haptic feedback IC 110 is internal to the electronic device 100, such as below the external surface 108 and/or device edges (e.g., an edge 122).

Like a traditional "button," each of the UI button regions 104 and 106 encompasses a UI area that is associated in memory 118 of the electronic device 100 with a specific control action, such as an action implemented by an operating system 124 or one or more application(s) 126 that are stored in the memory 118. The control action associated with each of the UI button regions 104 and 106 may take on a variety of forms in different implementations including, for example, a device control action (e.g., power on/off/standby, volume up, volume down), an application launch action (e.g., launch "camera" or "microphone"), or other application action (e.g., create a calendar reminder, compose a new text message, start audio of a playlist).

In some implementations, a user initiates the control action associated with a UI button region 104 and 106 by providing a touch direction after receipt of haptic feedback from the electronic device 100. For example, a user may drag a finger along the external surface 108 and feel haptic feedback (e.g., a vibration) when crossing a boundary of the UI button region 106. Responsive to receipt of the haptic feedback, the user may then "select" the control action associated with the UI button region 106 by providing a touch direction, such as by tapping one or more times within the UI button region 106. This touch direction triggers execution of the control action associated with the UI button region 106. For example, tapping on the UI button region 106 after receiving the haptic feedback from the haptic feedback IC 110 may cause an electronic device 100 to enter or exit a "silent mode" or to switch from one power state to another (e.g., stand-by mode to full-power mode). In other implementations, the control action associated with a button region is triggered responsive to initial touch detection without requiring a specific touch direction following the user's receipt of haptic feedback. For example, a control action may automatically execute when a user drags a finger over the external surface 108 and contacts the UI button region 106.

The nature of haptic feedback response generated by the haptic feedback provider 114 and haptic feedback IC 110 may vary based on the type of control action associated with the UI button regions 104 or 106. For example, haptic feedback response may vary in intensity (e.g., vibration strength) and/or duration to allow a user to differentiate the UI button regions 104 and 106 from one another. The UI button region 104 may, for example, be a power button configured to deliver a first haptic feedback response pattern while the UI button region 106 is, for example, a volume button that is configured to deliver a second different feedback response pattern. A feedback response pattern is, for example, a defined number of independently-discernable sensations (e.g., pulses of force or vibration) that are each further characterized by duration and intensity. The use of different haptic feedback patterns in association with different UI button regions allows a user to quickly determine which UI button region is currently below the user's finger without looking at the electronic device 100. Moreover, the use of different haptic feedback response patterns also allows a user to easily find a desired button even if the electronic device 100 varies the placement and/or the size of the UI button regions 104 and 106 at different times.

The touch detector 116 and haptic feedback provider 114 include software components for executing various actions in detecting touch and providing haptic feedback. Software components of the touch detector 116 and haptic feedback provider 114 are stored in memory 118 and executable by a processor 120 of the electronic device 100. In some implementations, aspects of the touch detector 116 and/or haptic feedback provider 114 are stored in memory of another device communicatively coupled to the electronic device 100, such as an accessory device or other networked device.

In one implementation, the haptic feedback IC 110 includes one or more piezoelectric actuators. When pressure is detected on a touch surface near the piezoelectric actuators, the piezoelectric actuators are energized to provide a surface vibration that can be felt by the user.

In still other implementations, the haptic feedback IC 110 includes circuitry for modulating surface friction felt by a user on different areas of the external surface 108. In general, modulated surface friction is a variation in the voltage applied to a surface at the user's finger that causes a variable "pulling" sensation. As the user drags a finger across a surface with modulated surface friction, the finger will appear to stick more to certain areas than other areas, creating the illusion of texture. Thus, implementations of the haptic feedback IC 110 that deliver modulated surface friction may appear to delivery different textures (e.g., scratchy, bumpy) that are usable to distinguish the UI button regions 104 and 106 from one another and from the other (e.g., non-interactive) areas of the external surface 108. Still other implementations may implement different types of haptic feedback in addition to those discussed above.

Figure 2:
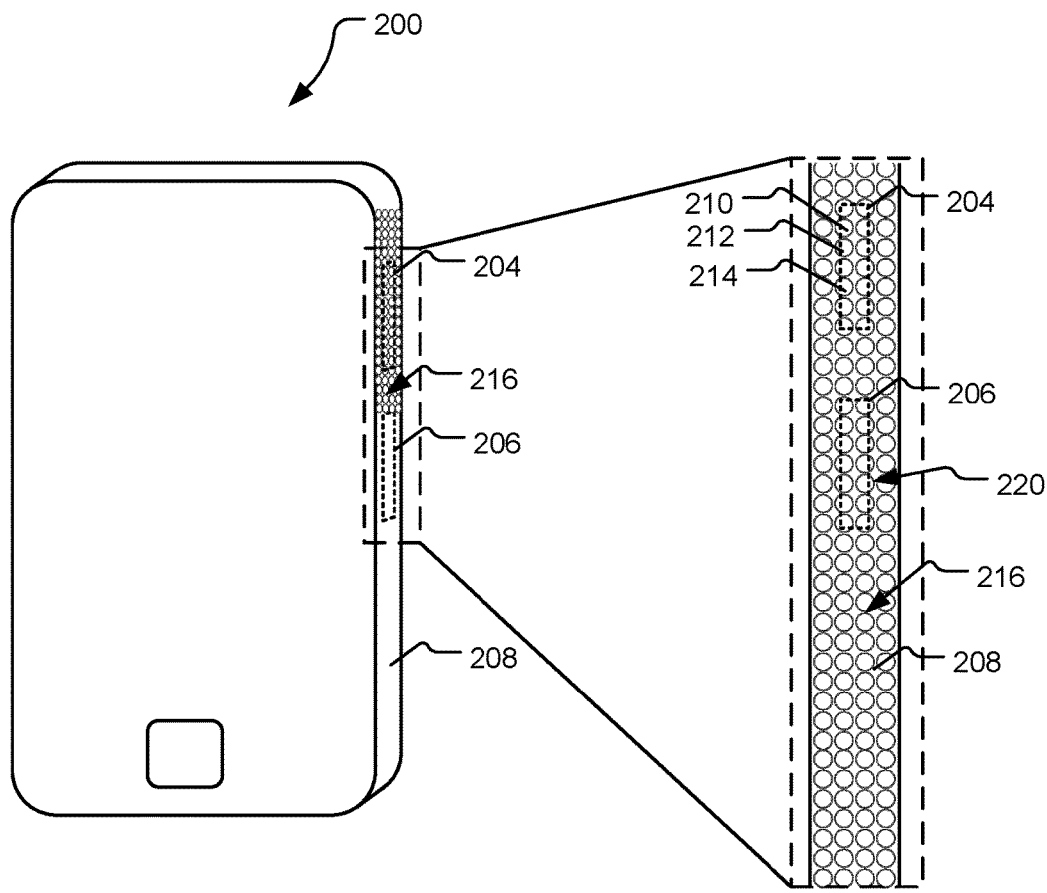
FIG. 2 illustrates an example electronic device with an embedded grid of piezoelectric actuators that are selectively energized to provide localized haptic feedback along the boundaries of user interface button regions.

FIG. 2 illustrates an example electronic device 200 including an embedded grid 216 of piezoelectric actuators that are selectively actuated to provide localized haptic within user interface (UI) button regions 204 and 206. The UI button regions 204 and 206 are flush and continuous with the external surface 208. The UI button regions 204 and 206 do not include traditional three-dimensional buttons that move up and down but are instead defined by a physical two-dimensional (e.g., rectangular) boundary on the external surface 208, which is in one implementation a substantially flat surface. The boundary of each of the UI button regions 204 and 206 crosses over several individual piezoelectric actuators (e.g., piezoelectric actuators 210, 212, 214 depicted as circles in FIG. 2) of the embedded grid 216. The number and size of piezoelectric actuators in the embedded grid 216 may vary in different implementations. In one example implementations, each of the piezoelectric actuators is a few (e.g., 2-3) millimeters in diameter.

In one implementation, the embedded grid 216 of piezoelectric actuators is positioned below a touchscreen (not shown), which includes a capacitive grid for detecting touch and/or proximity of a user to localized regions on the touchscreen. In another implementation, the piezoelectric actuators function as touch sensors that detect touch on the external surface 208 and also provide haptic feedback to the external surface 208.

The electronic device 200 further includes a processor (not shown) and one or more applications (not shown) for identifying initial touch input and actuating one or more of the piezoelectric actuators in the embedded grid 216 in a localized area responsive to detection of touch input in that localized area. For example, piezoelectric actuators aligned along a side boundary 220 of the UI button region 206 may be energized responsive to an initial detection of a user's finger positioned on the external surface 208 at or near the side boundary 220 and/or within the UI button region 206. In different implementations, the piezoelectric actuators may be energized responsive to touch input in different regions. In one implementation, all of the actuators in the UI button region 206 are energized responsive to detection of a user's finger within the UI button region 206. In another implementation, one or more actuators underlying a boundary of a UI button region are energized responsive to touch detection at or near the boundary.

Some implementations of the grid 216 may include the piezoelectric actuators arranged according to a pattern different than that show in FIG. 2. For example, piezoelectric actuators may define a perimeter of a UI button region but not be included within the area internal to the perimeter. Alternatively, the piezoelectric actuators may be arranged to form other (e.g., non-rectangular) patterns, and may include a variety of different spacing between adjacent piezoelectric actuators.

In one implementation, the actuators along a side boundary 220 of the UI button region 206 are energized responsive to detection of a user's finger at a point aligned with or proximal to the boundary. In another implementation, the actuators along the side boundary 220 of the UI button region 206 are energized when a user "swipes" a finger across the side boundary 220 (e.g., such when the finger is detected on each side of the side boundary 220).

Haptic feedback provided by the piezoelectric actuators helps to inform a user of the location of the UI button regions 204 and 206 even if the UI button regions 204 and 206 are not physically visible and/or otherwise discernable as "different" from the remaining non-UI surface area of the external surface 208.

Different UI button regions, such as the UI button regions 204 and 206, may each be associated with a different haptic feedback response pattern that the user may rely on to distinguish the UI button regions 204 and 206 from one another. For example, one haptic response pattern may be characterized by a low-intensity vibration of a first duration (e.g., a few milliseconds) while another haptic feedback response pattern is characterized by a high-intensity vibration of the same duration or of a different duration. Still other haptic feedback response patterns include multiple discrete "pulses" of haptic feedback, such as a series of two or more vibrations that themselves can also vary in intensity and duration.

In addition to being associated with a specific feedback response pattern, each of the UI button regions 204 and 206 is further associated in memory of the electronic device 200 with a control action, such as a device control action (e.g., power on/off/standby, volume up, volume down), an application launch action (e.g., launch "camera" or "microphone"), or other application action (e.g., create a calendar reminder, compose a new text message, start audio of a playlist). Thus, the user may initiate a desired control action without looking at the electronic device 200 by using a finger to identify a surface region that delivers a haptic response pattern that the user recognizes as associated with a UI button region for the desired control action. For example, a user may run a finger along the side of the device until a soft buzz or sequence of buzzes (e.g., two quick vibrations in succession) is felt. The intensity, duration, and number of discrete "buzzes" informs the user of the nature of the UI button region that is the finger is currently in position to select. For example, an intense, short single buzz may indicate a volume up UI button region while a soft, short single buzz indicates a volume down UI button region, and a long medium-intensity buzz indicates a power-related (e.g., on/off/standby) UI button region. In one implementation, a user selects a control action by tapping a UI region after receiving the haptic feedback that allows the user to identify the UI button region.

In some implementations, the electronic device 200 may allow a user to selectively configure the UI button regions and the haptic feedback response pattern associated with each of the UI button region. For example, a user may choose one or more control actions to be represented as UI button regions. Additionally, the user may selectively configure the haptic feedback response pattern associated with each of the UI button regions and, in some implementations, the user may also select the size and placement of each of the UI button regions. In other implementations, control actions represented as UI button regions are preset by a device manufacturer. Other characteristics of the regions (e.g., size, position, haptic feedback response pattern) may be preset and/or selectively reconfigurable by an end user.

In FIG. 2, the grid 216 of piezoelectric actuators is arranged below a side surface of the electronic device 200. In other implementations, the embedded grid 216 spans along a back side (not shown) of the electronic device 200 and/or includes actuators spanning along one or more seams of the electronic device 200. Some implementations may additionally or alternatively include an embedded grid of piezoelectric actuators below a touchscreen display so as to allow for delivery of haptic feedback when a user's finger is positioned to select a digital icon from the light-emitting display. Other implementations may include piezoelectric actuators in other locations.

Figure 3:
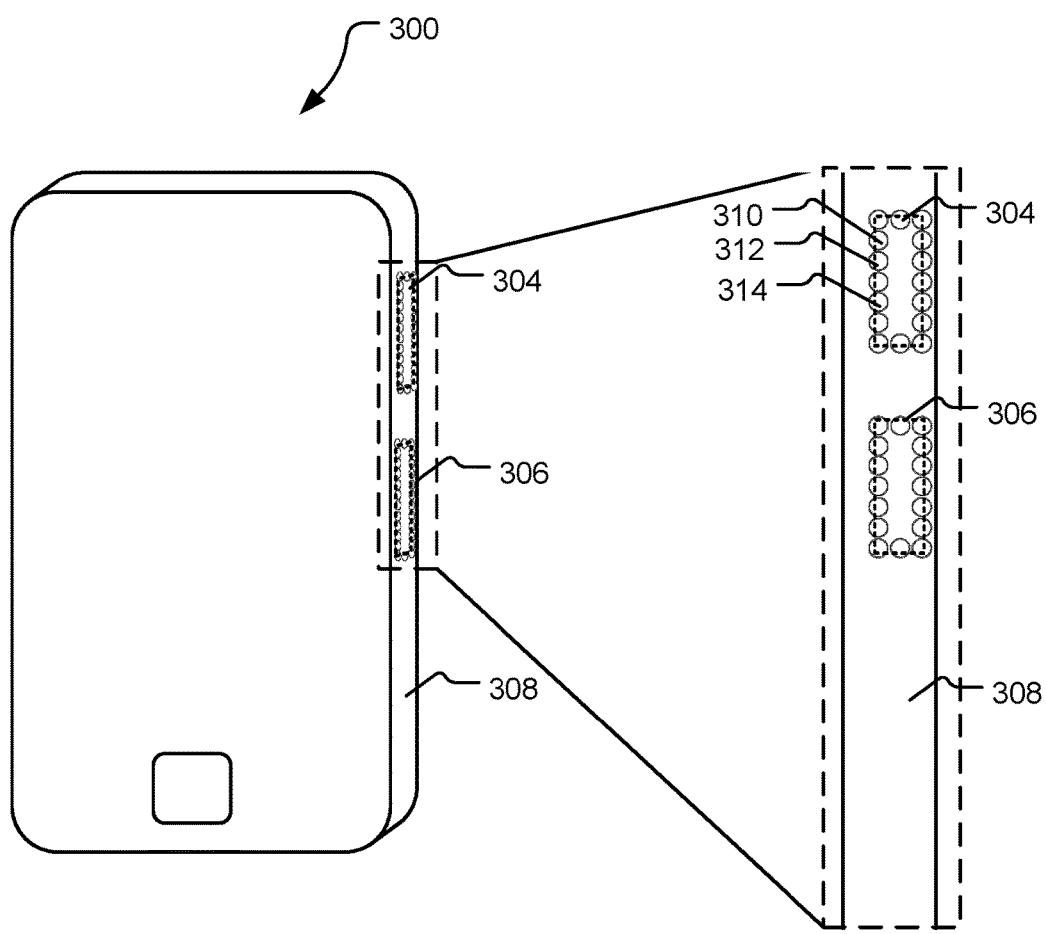
FIG. 3 illustrates an example electronic device including piezoelectric actuators bounding user interface (UI) button regions that are configured for selective actuation to provide localized haptic feedback an external surface of the electronic device.

FIG. 3 illustrates an example electronic device 300 including piezoelectric actuators (e.g., piezoelectric actuators 310, 312, and 314) bounding user interface (UI) button regions 304 and 306 that are configured for touch-responsive actuation to provide localized haptic feedback to an external surface 308 of the electronic device 300. Like the UI button regions described with respect to FIG. 2, the UI button regions 304 and 306 are flush and continuous with the external surface 308. In contrast to FIG. 2, the electronic device 300 does not include a continuous grid of piezoelectric actuators. Rather, piezo electric actuators are selectively arranged along boundaries of the UI button regions 304 and 306.

In another implementation (not shown), a single piezoelectric actuator is positioned within or near a UI button region to provide localized haptic feedback responsive to touch detection. For example, each of the UI button regions 304 and 306 may have a center that is near or aligned with a single piezoelectric actuator that provides the localized haptic feedback for the entire UI button region 304 or 306.

Figure 4:
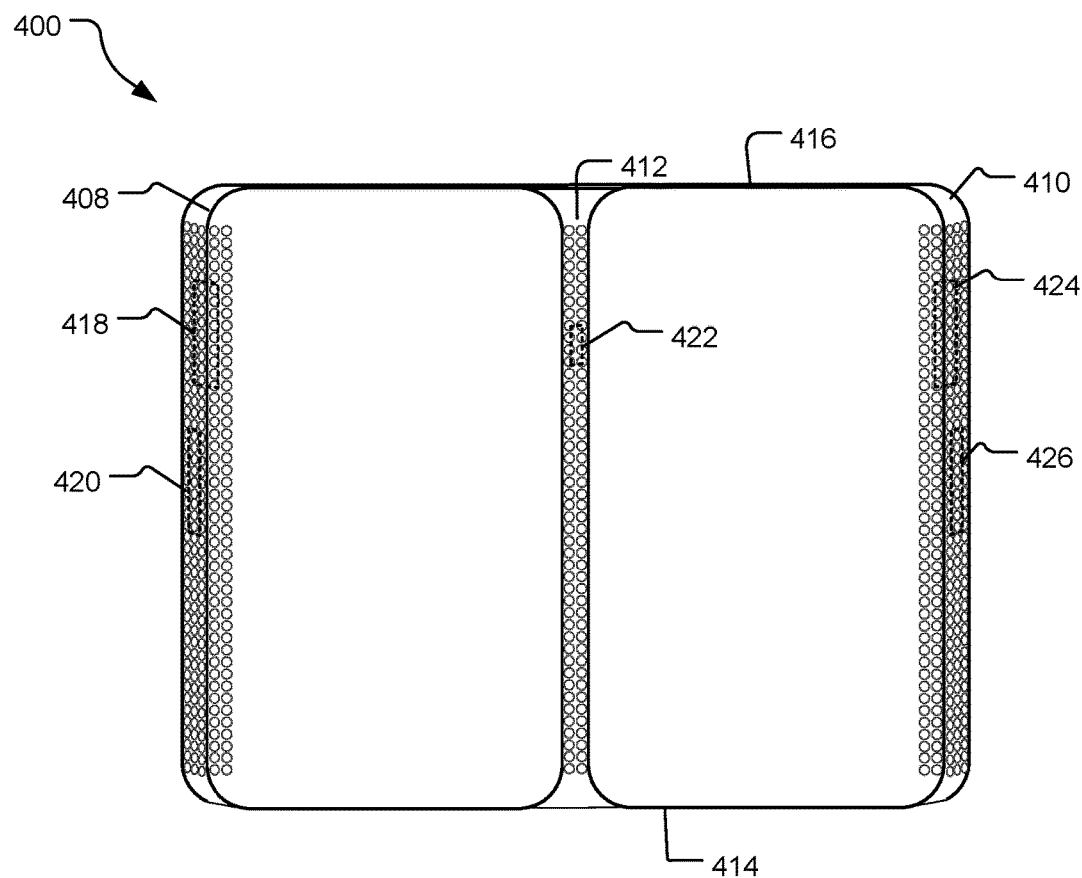
FIG. 4 illustrates an example foldable electronic device with piezoelectric actuators embedded in an edge region and a hinge region to provide haptic feedback responsive to touch detection.

FIG. 4 illustrates an example foldable electronic device 400 with grids of piezoelectric actuators embedded in edge regions 408, 410 and a hinge region 412. The piezoelectric actuators in the edge regions 408, 410 and the hinge region 412 generally extend from a bottom edge 414 to a top edge 416 of the foldable electronic device 400. This distribution of piezoelectric actuators allows UI button regions (e.g., UI button regions 418, 420, 422, 424, and 426) to be in traditionally unused spaces, such as in the hinge region 412 or other "seam" region. Responsive to detection of touch input at one of the UI button regions 418, 420, 422, 424, or 426, nearby (e.g., underlying or adjacent) piezoelectric actuators are energized so that a user is provided with a localized haptic feedback response at or near the button region where the touch input was detected.

For example, piezoelectric actuators within or along a boundary of the UI button region 418 may be energized to provide a haptic feedback response pattern to a finger that is positioned in contact with a boundary of the UI button region 418 or in contact with a location on the external surface of the foldable electronic device 400 that is internal to the boundary of the UI button region 418.

Figure 5:
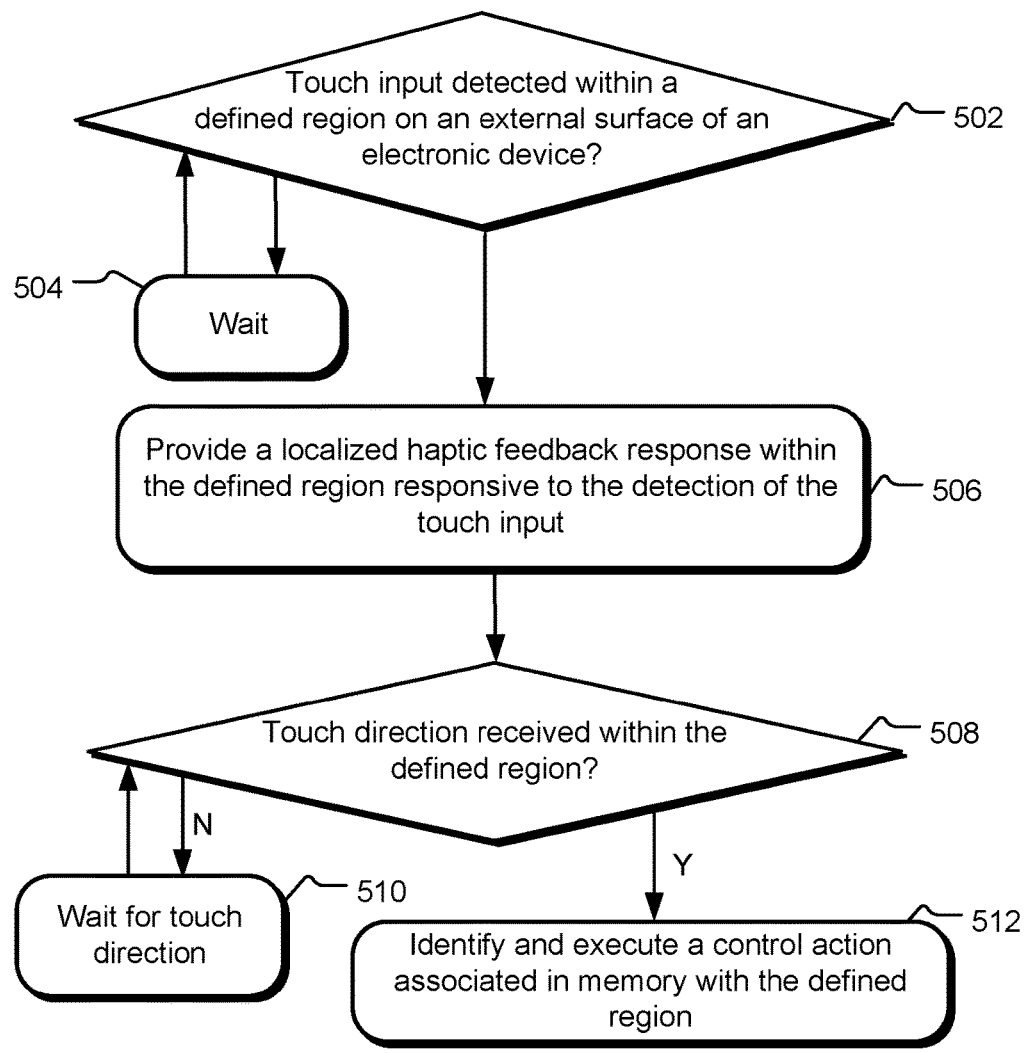
FIG. 5 illustrates example operations for providing localized haptic feedback that assists a user in identifying a location of a defined region prior to initiating a control action associated with the defined region.

FIG. 5 illustrates example operations for providing localized haptic feedback that assists a user in identifying a location of a defined region prior to initiating a control action associated with the defined region. A determination operation 502 determines whether a touch input has been detected within a defined region on an external surface of an electronic device. In one implementation, the defined region is a region that is associated in memory with selective execution of a device control action, such as an operation executed by an application or operating system. If the determination operation 502 determines that a touch input has not been detected within the defined region, a waiting operation 504 commences until a touch input is subsequently detected within the defined region.

Once the determination operation 502 determines that a touch input has been detected within the defined region, a haptic feedback provisioning operation 506 provides a localized haptic feedback response that is detectable by a user's finger within the defined region. In one implementation, the localized haptic feedback response is felt in the form of vibrations, "pops," or other force delivered by one or more piezoelectric actuators; in another implementation, the localized haptic feedback is felt in the form of surface friction variations realized due to selective variations in applied surface voltage.

Another determination operation 508 determines whether a touch direction has been received in association with the defined region of the external surface following the detection of the touch input. The touch direction is received separately from the touch input that triggers the localized haptic feedback response. For example, one touch direction may be a gesture such as a tap or double tap performed within or proximal to the defined region following the localized haptic feedback response. In this sense, the localized haptic feedback response helps a user to confirm that his or her finger is correctly positioned relative to the defined region such that the user can then perform the touch direction to selectively initiate a control action associated with the defined region.

If the determination operation 508 determines that the touch direction has not been received, a waiting operation 510 commences to wait for some period of time, such as until a wait timer expires. Once the determination operation 508 detects the touch direction, a control action identification and execution operation 512 identifies and executes a control action that is associated in memory with the defined region of the external surface.

Figure 6:
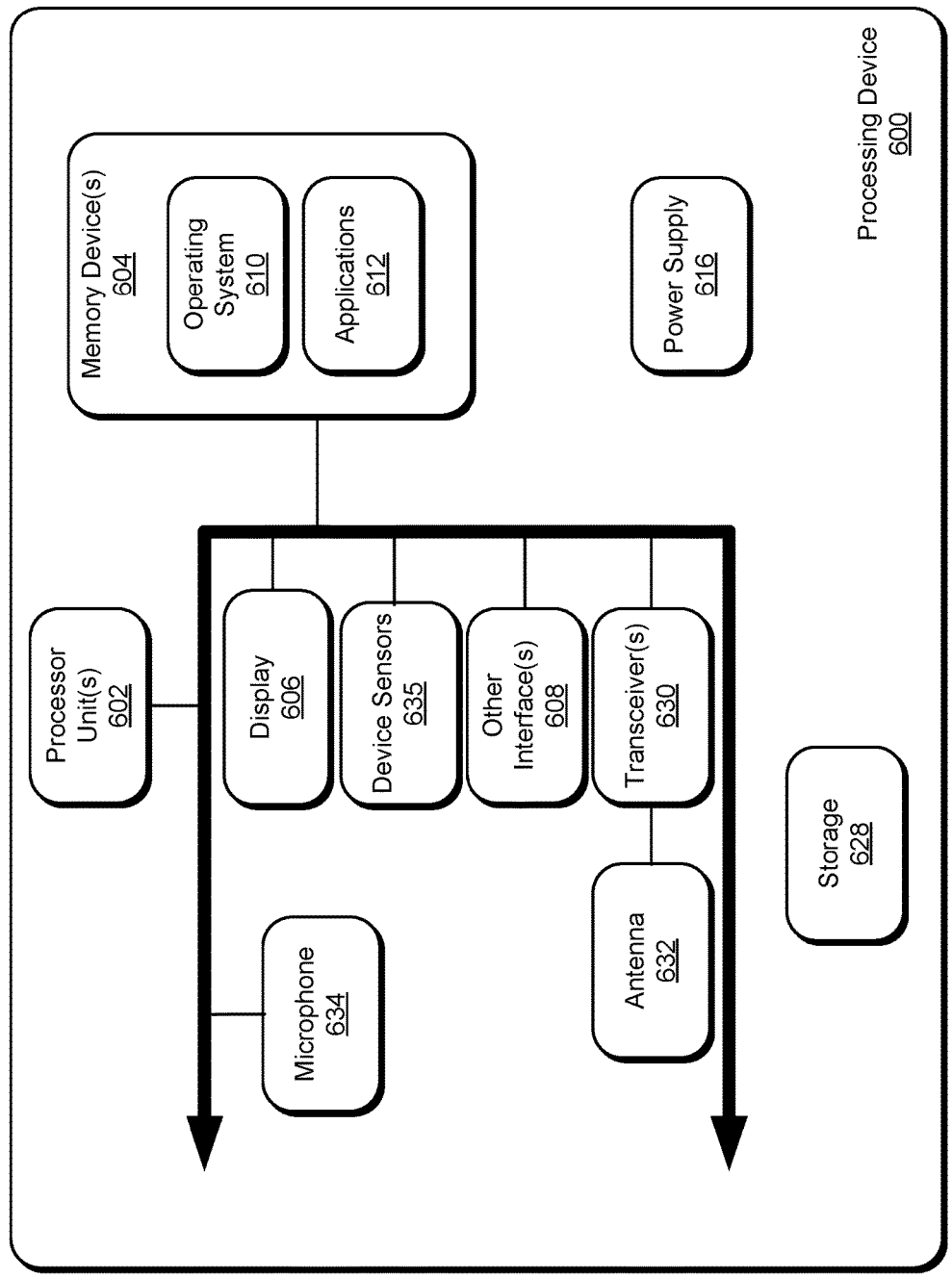
FIG. 6 illustrates an example schematic of a processing device suitable for implementing the disclosed technology.

FIG. 6 illustrates an example schematic of a processing device 600 suitable for including UI button regions that deliver haptic feedback responsive to a user's touch. The processing device 600 includes one or more processing unit(s) 602, one or more memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processing unit(s) 602, although other operating systems may be employed.

One or more applications 612, such as a haptic feedback provider or touch detector are loaded in the memory 604 and executed on the operating system 610 by the processing unit(s) 602. The applications 612 may receive input from the display 606 and/or a device sensors 635 embedded within or beneath the display 606. The processing device 600 includes a power supply 616, which is powered by one or more batteries or other power sources and which provides power to other components of the processing device 600. The power supply 616 may also be connected to an external power source that overrides or recharges the built-in batteries or other power sources.

The processing device 600 includes one or more communication transceivers 630 and an antenna 632 to provide network connectivity (e.g., a mobile phone network, Wi-Fi®, BlueTooth®). The processing device 600 may also include various other components, such as a positioning system (e.g., a global positioning satellite transceiver), one or more accelerometers, one or more cameras, an audio interface (e.g., a microphone 634, an audio amplifier and speaker and/or audio jack), and storage devices 628. Other configurations may also be employed. In an example implementation, a mobile operating system, various applications and other modules and services may be embodied by instructions stored in memory 604 and/or storage devices 628 and processed by the processing unit(s) 602. The memory 604 may be memory of host device or of an accessory that couples to a host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method disclosed herein includes detecting touch input within a defined region on an external surface of an electronic device that is associated in memory with a control action. The method further includes providing a localized haptic feedback response within the defined region responsive to the detection of the touch input; and executing the control action responsive to detection of a touch direction within the defined region subsequent to receipt of the touch input.

An example method according to any preceding method further includes providing the localized haptic response at a boundary of the defined region responsive to detection of touch input at two points on opposite sides of the boundary.

In another method of any preceding method, the localized haptic response varies based on the control action associated with the defined region.

In still another method of any preceding method, the localized haptic response varies in at least one of intensity and duration based on a type of the control action associated with the defined region.

In another method of any preceding method, providing the localized haptic response further includes exciting one or more piezoelectric actuators responsive to the detection of the touch input at the defined region.

In still another example method of any preceding method, the control action is selected from a group comprising a volume adjustment and a power control.

In another example method of any preceding method, the electronic device is configured to fold along a seam and the defined region is on the seam.

In another example method of any preceding method, the external surface is a non-display surface of the electronic device.

An example electronic device disclosed herein includes memory associating a control action with a defined region on an external surface of the electronic device, a haptic feedback provider stored in the memory and executable by a processor to provide a localized haptic feedback response at the defined region responsive to detection of touch input at the defined region; and an application stored in the memory and executable by the processor to execute the control action of the electronic device responsive to detection of a touch direction performed in association with the defined region subsequent to receipt of the touch input.

In one example electronic device of any preceding electronic device, the localized haptic response varies based on the control action associated with the defined region.

In another example electronic device of any preceding electronic device, the localized haptic response varies in at least one of intensity and duration based on the control action associated with the defined region.

In yet another example electronic device of any preceding electronic device, the localized haptic response further comprises exciting one or more piezoelectric actuators responsive to the detection of the touch input at the defined region.

In still another example electronic device of any preceding electronic device, the electronic device is configured to fold along a seam and the defined region overlaps the seam.

In another example electronic device of any preceding electronic device, the external surface is a non-display of the electronic device.

In yet another example electronic device of any preceding electronic device, the touch direction includes a gesture performed within the defined region.

An example computer-readable storage media of a tangible article encodes a computer process including the steps of: detecting touch input within a first region of an external surface of an electronic device; providing a first haptic feedback response responsive to the detection of the touch input within the first region; detecting touch input within a second region of an external surface of the electronic device; and providing a second haptic feedback response to the detection of the touch input at the second region, the first haptic feedback response different from the second haptic feedback response.

In another example encoded computer process of any preceding computer process, the computer process further includes the steps of executing a first control action responsive to detection of a touch direction within the first region subsequent to the detection of the touch input within the first region, and executing a second different control action responsive to detection of a touch direction within the second region subsequent to the detection of the touch input within the second region.

In another example computer process of any preceding computer-readable storage media, the first haptic feedback response differs from the second haptic feedback response in at least one of intensity and duration.

In another example computer process of any preceding computer process, the electronic device is configured to fold along a seam and at least one of the first region and the second region overlaps an area of the seam.

In still another example computer process of any preceding computer process, at least one of the first haptic feedback response and the second haptic feedback response is generated by piezoelectric actuators.

An example electronic device disclosed herein includes a means for detecting touch input within a defined region on an external surface of an electronic device that is associated in memory with a control action; a means for providing a localized haptic feedback response within the defined region responsive to the detection of the touch input; and a means for executing the control action responsive to detection of a touch direction within the defined region subsequent to receipt of the touch input.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
    detecting touch input within a defined region on a seam of an external surface of an electronic device, the electronic device being configured to fold along the seam and the defined region being associated in memory with a control action;
    providing a localized haptic feedback response within the defined region responsive to the detection of the touch input; and
    executing the control action responsive to detection of a touch direction within the defined region, the touch direction detected subsequent to the provisioning of the localized haptic feedback response and the detection of the touch input.

2. The method of claim 1, wherein providing the localized haptic feedback response further comprises providing the localized haptic feedback response at a boundary of the defined region responsive to detection of touch input at two points on opposite sides of the boundary.

3. The method of claim 1, wherein the localized haptic feedback response varies based on the control action associated with the defined region.

4. The method of claim 1, wherein the localized haptic feedback response varies in at least one of intensity and duration based on a type of the control action associated with the defined region.

5. The method of claim 1, wherein providing the localized haptic feedback response further comprises:
    exciting one or more piezoelectric actuators responsive to the detection of the touch input at the defined region.

6. The method of claim 1, wherein control action is selected from a group comprising a volume adjustment and a power control.

7. The method of claim 1, wherein the external surface is a non-display surface of the electronic device.

8. An electronic device comprising:
    memory associating a control action with a defined region on a seam of an external surface of the electronic device, the electronic device being configured to fold along the seam;
    a haptic feedback provider stored in the memory and executable by a processor to provide a localized haptic feedback response at the defined region responsive to detection of touch input at the defined region; and
    an application stored in the memory and executable by the processor to execute the control action of the electronic device responsive to detection of a touch direction performed in association with the defined region, the detection of the touch direction being subsequent to the provisioning of the localized haptic feedback response and subsequent to the detection of the touch input.

9. The electronic device of claim 8, wherein the localized haptic feedback response varies based on the control action associated with the defined region.

10. The electronic device of claim 8, wherein the localized haptic feedback response varies in at least one of intensity and duration based on the control action associated with the defined region.

11. The electronic device of claim 8, wherein providing the localized haptic feedback response further comprises:
    exciting one or more piezoelectric actuators responsive to the detection of the touch input at the defined region.

12. The electronic device of claim 8, wherein the external surface is a non-display surface of the electronic device.

13. The electronic device of claim 8, wherein the touch direction includes a gesture performed within the defined region.

14. One or more computer-readable storage media of a tangible article of manufacture encoding computer-executable instructions for executing on a computer system a computer process, the computer process comprising:
    detecting touch input within a first region of an external surface of an electronic device, the electronic device being configured to fold along a seam;
    providing a first haptic feedback response responsive to the detection of the touch input within the first region;
    executing a first control action responsive to detection of a touch direction within the first region, the touch direction being received subsequent to the provisioning of the first haptic feedback response;
    detecting touch input within a second region of an external surface of the electronic device;
    providing a second haptic feedback response to the detection of the touch input at the second region, the first haptic feedback response different from the second haptic feedback response; and
    executing a second different control action responsive to detection of a touch direction within the second region, the touch direction within the second region being received subsequent to the detection of the touch input within the second region, wherein at least one of the first region and the second region overlaps an area of the seam.

15. The one or more computer-readable storage media of claim 14, wherein the first haptic feedback response differs from the second haptic feedback response in at least one of intensity and duration.

16. The one or more computer-readable storage media of claim 14, wherein the electronic device is configured to fold along a seam and at least one of the first region and the second region overlaps an area of the seam.

* * * * *